March 24, 1925.
J. F. HERMAN
1,530,940
CONNECTING LINK FOR ANTISKID CHAINS
Filed April 18, 1922
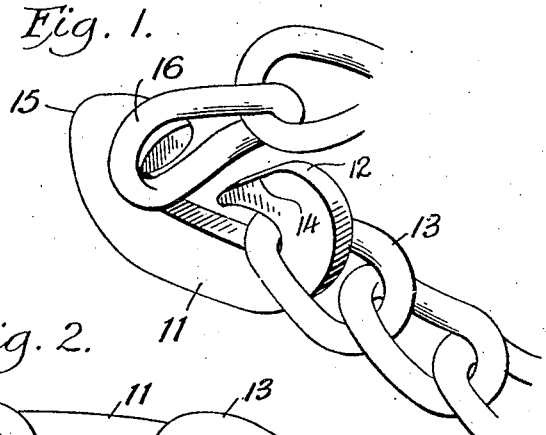
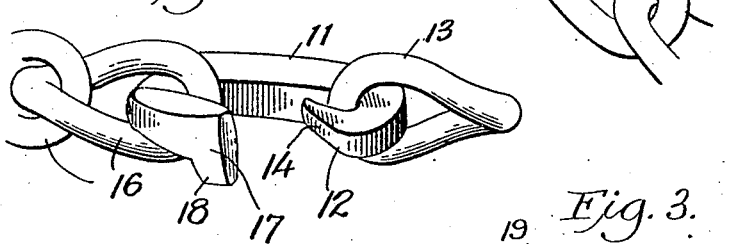
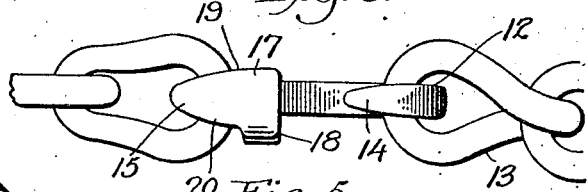
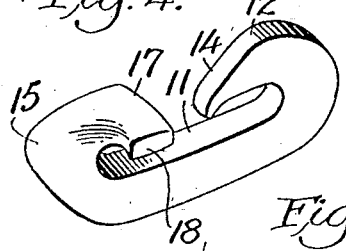
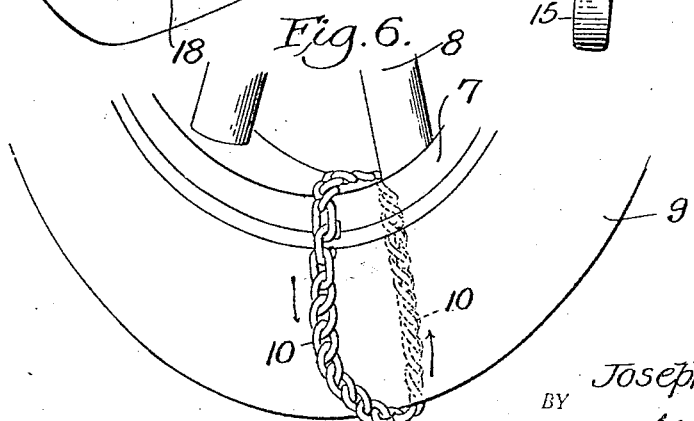
INVENTOR.
Joseph F. Herman,
BY
ATTORNEY.

Patented Mar. 24, 1925.

1,530,940

UNITED STATES PATENT OFFICE.

JOSEPH F. HERMAN, OF WASHINGTON, DISTRICT OF COLUMBIA.

CONNECTING LINK FOR ANTISKID CHAINS.

Application filed April 18, 1922. Serial No. 554,658.

*To all whom it may concern:*

Be it known that I, JOSEPH F. HERMAN, a citizen of the United States, residing at Washington, in the District of Columbia, have invented certain new and useful Improvements in Connecting Links for Antiskid Chains, of which the following is a specification.

The present invention relates to anti-skidding chains for wheels of automobiles and trucks and consists in the combinations and arrangements of parts hereinafter described and particularly set forth in the accompanying claim.

The invention has for its purpose to provide an anti-skidding chain of single length which is arranged and carried by the wheel in a manner permitting said chain to travel continuously around the wheel felly and tire thereby obtaining the maximum efficiency or working area for the single chain on the wheel.

A further purpose of the invention is to provide an individual chain of this type which will have positive engagement with the surface of the roadway passed over, but which is so attached to the wheel as to creep transversely of the tire, and about the longitudinal axis of the chain itself, thereby subjecting the chain to uniform wearing throughout.

Another purpose of the invention is to provide the chain with a novel form of attaching or fastening means which is of simple construction and readily manipulated for applying or removing the chain from the wheel, but which will effectively hold under all normal working conditions and wear to which the chain would be subjected.

The construction of connecting link disclosed herein is proposed as an improvement over the type of connecting link is shown in the co-pending application for U. S. Letters Patent of Elisha G. Thomas, Serial No. 292,350, filed April 22, 1919, and of which I am the assignee of the entire right, title and interest by virtue of assignment recorded in the transfers of U. S. patents, liber U-115, page 39; and the co-pending application forming a division of said application, Serial No. 554,392, filed April 18, 1922, and of which I am the assignee by virtue of assignment recorded in the transfers of U. S. patents, liber R-117, page 330.

The invention is shown by way of illustration in the accompanying drawings, wherein:—

Figures 1, 2 and 3 illustrate the operations necessary for connecting the link with the chain when applying the device to a wheel.

Fig. 4 is a detail perspective view of the connecting link per se.

Fig. 5 is an end elevational view of the same, and

Fig. 6 shows the chain and connecting link in applied position.

Referring to the construction in further detail and with like reference characters designating corresponding parts in the different views shown, 7 represents the rim, 8 the spokes and 9 the tire of any automobile wheel.

The anti-skidding device comprises a single chain length 10 that is adapted to be fitted about the tire and felly or rim of the wheel in the manner shown in Fig. 6. The length of the chain and connecting link are such that when assembled they will grip the tire and rim with sufficient tautness to serve the anti-skidding function and yet allow the chain to automatically creep transversely of the tire after the manner indicated by the arrows A in Fig. 6. In addition to this function or operation of the chain said chain will automatically turn or twist about the longitudinal axes of the respective chain links, i. e., the chain as a whole turns or twists bodily quite independently of its lengthwise traveling movement. For a more detailed description of the construction of chain and its manner of operation, reference may be had to the two co-pending applications for patent above identified.

The chain-connecting device consists of an open link or shank portion 11 of substantially rectagular cross-section having a hooked end 12 that is securely fastened to the end link 13 of the chain 10. The extreme end portion 14 of the hook portion 12 is appreciably reduced or pointed and turned in, (see Fig. 2) to obviate any likelihood of the hooks injuring the tire of the wheel rim.

The attaching end of the connecting link 11 is formed with an upwardly and outwardly disposed portion 15, having for its function to engage with the two free end links 16 of the chain 10 to avoid all likelihood of displacement of connecting link should the chain 10 as a whole become slack from any cause, and to withstand the violent movements of the chains which necessarily occur incident to the use of the device on the wheel. The attaching end portion of the connecting link 11 is formed with a flattened head 17 of substantially rectangular cross-section and having a laterally projecting portion 18 which functions as a retaining element to hold said bar 11 connected with the free end link of the chain 10 against displacement, but to permit of simple and easy manual connection or disconnection between said connecting link and free end link when desired.

To apply or remove the device as a whole requires only the taking up of the slack in the chain and turning the free ends 16 to substantially the cross-wise direction shown in Figure 1 when the same may be conveniently passed over the head 17 and retaining hook portion 18 in substantially the manner shown in Figs. 1 and 2.

The provision of the flaring side surfaces 19 and 20 and the curved surface 21 adapts the device to be readily connected to or removed from chains of different shape or twist by a simple and easily performed manipulation of the hands.

It is obvious that those skilled in the art may vary the details of construction and arrangement of parts without departing from the spirit of my invention, and, therefore, I do not wish to be limited to such features except as may be required by the claim.

What is claimed as new is:

A connecting link for chains comprising a shank bent upon itself at one end to form a hook, the end of said hook being flattened and having a laterally projecting portion formed with a flattened end, the side of the shank adjacent the laterally projecting portion being tapered and provided with a curved surface whereby the link may be readily attached to or detached from chains of different shape, substantially as set forth.

In testimony whereof I affix my signature.

JOSEPH F. HERMAN.